J. J. SIMMONDS.
RAKE OPERATING MECHANISM FOR ORE ROASTING FURNACES.
APPLICATION FILED JULY 16, 1914.

1,133,068. Patented Mar. 23, 1915.
6 SHEETS—SHEET 1.

J. J. SIMMONDS.
RAKE OPERATING MECHANISM FOR ORE ROASTING FURNACES.
APPLICATION FILED JULY 16, 1914.

1,133,068.

Patented Mar. 23, 1915.
6 SHEETS—SHEET 2.

Fig 2

WITNESSES:
R. Hamilton
E. B. House

INVENTOR.
John J. Simmonds
BY Warren D. House
His ATTORNEY.

J. J. SIMMONDS.
RAKE OPERATING MECHANISM FOR ORE ROASTING FURNACES.
APPLICATION FILED JULY 16, 1914.

1,133,068.

Patented Mar. 23, 1915.
6 SHEETS—SHEET 6.

UNITED STATES PATENT OFFICE.

JOHN J. SIMMONDS, OF IOLA, KANSAS, ASSIGNOR TO THE SIMMONDS ENGINEERING COMPANY, OF IOLA, KANSAS, A CORPORATION OF KANSAS.

RAKE-OPERATING MECHANISM FOR ORE-ROASTING FURNACES.

1,133,068.

Specification of Letters Patent. Patented Mar. 23, 1915.

Application filed July 16, 1914. Serial No. 851,280.

*To all whom it may concern:*

Be it known that I, JOHN J. SIMMONDS, a citizen of the United States, residing at Iola, in the county of Allen and State of Kansas, have invented a certain new and useful Improvement in Rake-Operating Mechanisms for Ore-Roasting Furnaces, of which the following is a specification.

My invention relates to improvements in ore roasting furnaces.

It relates particularly to furnaces adapted for roasting zinc ores and to the type which employ two tiers of ovens disposed side by side and through which rakes are drawn and transferred from the ovens in one tier to the ovens in the other tier.

One of the objects of my invention is to provide a structure of the character described which may be easily operated by a small number of operators.

A further object of my invention is to provide a mechanism which will permit of the use of my invention in connection with ore roasting furnaces, which are now in operation at many points throughout the United States. Most of such furnaces employ as a power for operating the rakes a uni-direction motor, such as a steam engine or a gasolene engine.

One of the objects of my invention is to provide rake operating and controlling mechanism in connection with an engine or motor which runs continuously in one direction, and which does not have to be reversed in order to reciprocate the rakes.

Still another object of my invention is to provide novel means operable from an operator's platform adjacent to the furnace for controlling the mechanism which effects a reversal in the transmission of power between the motor and the mechanism for reciprocating the rakes.

Another object of my invention is to provide novel means operable from the operator's platform for throwing the rake operating mechanism into and out of connection with the driving mechanism.

A further object of my invention is to provide novel means which permits of the operation of the rake reciprocating mechanism, only at such times as the turn table locking mechanism is operated to hold the turn table in its operative positions.

Other novel features of my invention are hereinafter fully described and claimed.

In the accompanying drawings which illustrate the preferred embodiment of my invention.

Similar reference characters designate similar parts in the different views.

1 designates the body of an ordinary ore roasting furnace which is provided with two tiers of ovens 2, the ovens of each tier being disposed one above the other and connected with each other by means of holes 3 disposed adjacent to alternate ends of the ovens. The upper oven of each tier is provided in the top with a hole 4 through which the ore is fed.

Figure 6:
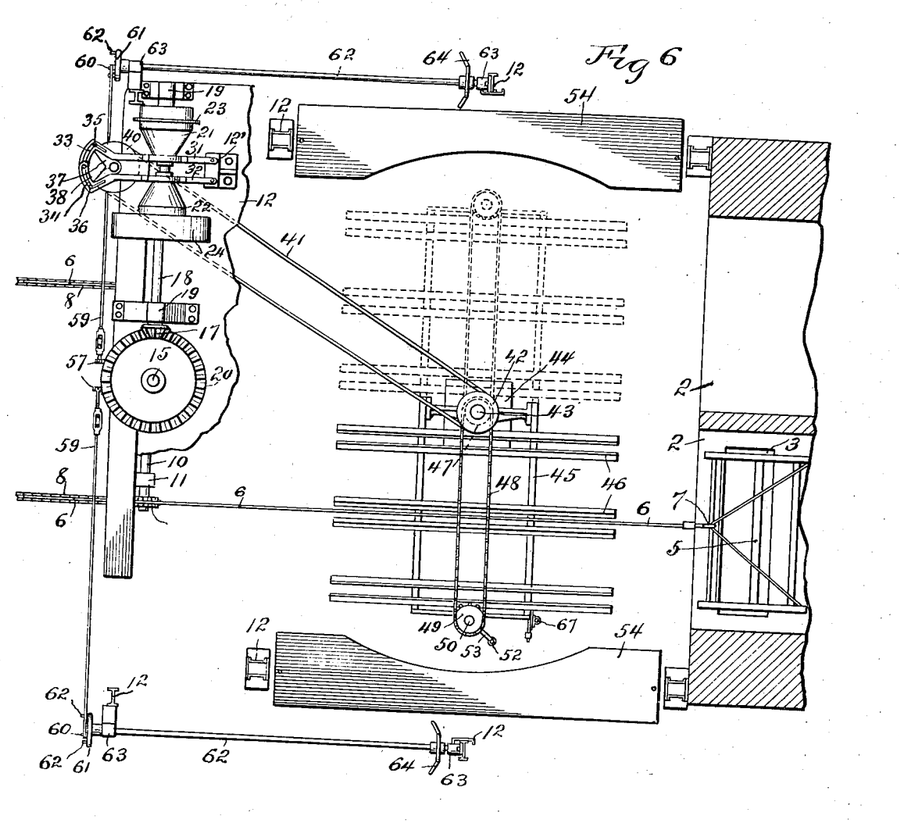
Fig. 6 is an enlarged view, partly in plan and partly in horizontal section of the mechanism at one end of the furnace, some of the parts being removed and some broken away.
Figure 7:
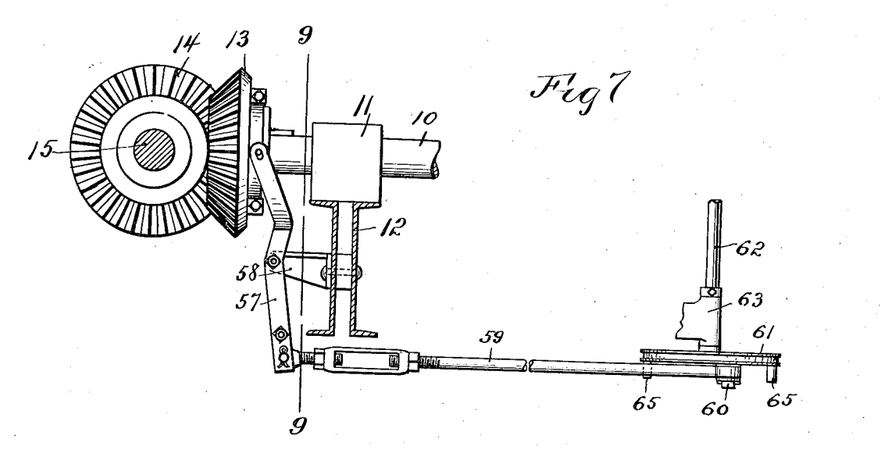
Fig. 7 is an enlarged horizontal sectional view, partly broken away, on the plane of the line 7—7 of Fig. 2, showing one of the sliding gears and parts connected therewith.
Figure 8:
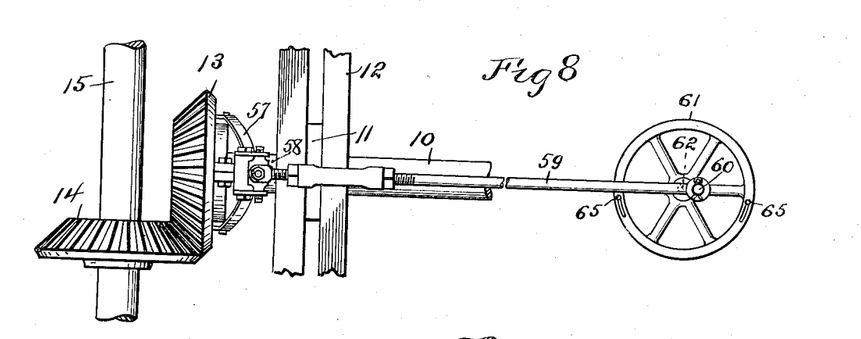
Fig. 8 is a front elevation of what is shown in Fig. 7.
Figure 9:
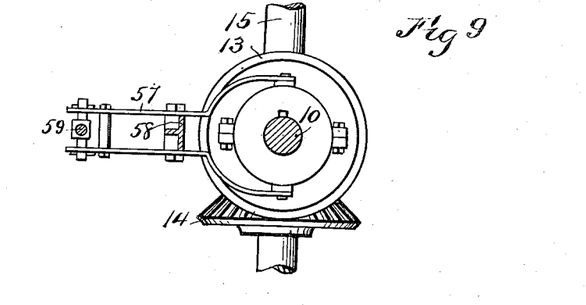
Fig. 9 is a vertical sectional view on the line 9—9 of Fig. 7.
Figures 10, 11:
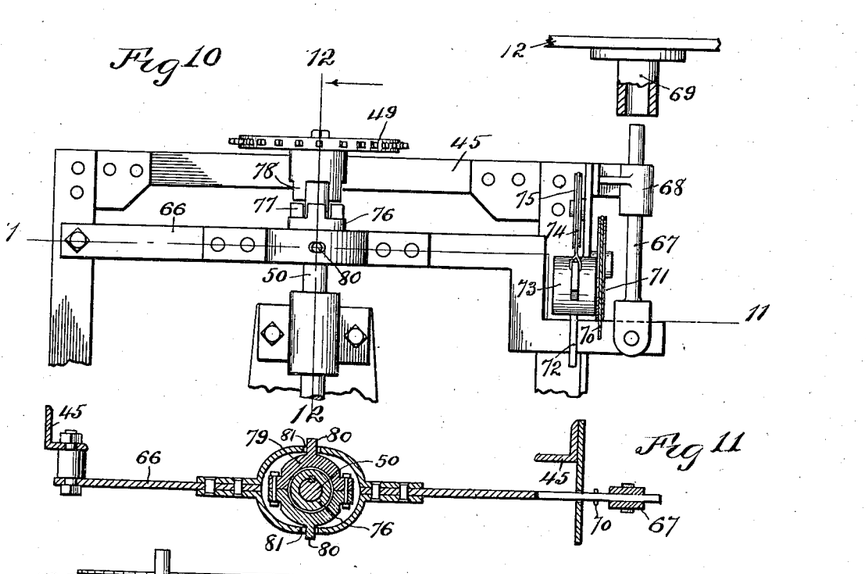
Fig. 10 is an enlarged side elevation of the upper part of one of the turn tables and parts carried thereby, and one of the locking sockets attached to the frame work, a portion of which is shown, the clutch and locking mechanism being shown in the unlocked position.
Fig. 11 is a horizontal sectional view on the broken line 11—11 of Fig. 10.

For raking the ore in each pair of ovens 2 located on the same level, there is provided a rake 5, one of which is partly shown in Fig. 6. These rakes are of the usual construction, and they are drawn through the ovens 2 by means of horizontal reciprocative rods 6 disposed two sets at each end of the furnace, one rod for each oven. Each rod 6 is provided at its inner end with a hook 7 adapted to releasably engage the rake at that level.

For reciprocating the rods 6 through the ovens there are provided four sets of chain belts 8, arranged two sets at each end of the furnace, the belts of each set being disposed one above the other. Said belts are disposed respectively adjacent to and are respectively secured to the rods 6.

For driving the chain belts 8 there are provided sprocket wheels 9 on which said belts are respectively mounted, and which are respectively secured to horizontal transverse shafts 10, which are rotatably mounted in bearings 11 supported on frame works 12, of which there is one at each end of the furnace. Splined respectively to and rotatable with said shafts 10 are bevel gear wheels 13 respectively adapted to be connected with and disconnected from bevel gear wheels 14, which are arranged in two sets at opposite ends of the furnace, and the two sets being respectively secured to two vertical rotary shafts 15 having their upper ends respectively mounted in the frameworks 12 and their lower ends being mounted in bearings 16, respectively, mounted on the ground or other suitable support.

Respectively secured to the upper ends of the shafts 15 are two bevel gear wheels, which respectively mesh with two bevel pinions 17 secured respectively to two transverse horizontal shafts 18, each mounted in bearings 19 secured to the adjacent framework 12. The said gear wheels are designated by 20. On each shaft 18 are splined thereto and rotatable therewith two clutch members 21 and 22 adapted to respectively operatively engage two pulley clutch members 23 and 24, which are rotatably mounted on the shaft 18, and which are respectively connected to two pulleys 27 and 28 by a twist belt 25 and a belt 26. The pulleys 27 and 28 are secured to a horizontal rotary shaft 29, which is continuously driven in one direction, and which may be the driving shaft of a uni-direction motor 30, such as a steam engine, electric motor or explosive engine.

For operating the clutch members 21 and 22, the following described mechanism may be provided:—Referring particularly to Figs. 2, 3, 5 and 6, 31 and 32 designate two horizontal levers having one set of ends pivoted respectively to a bracket 12' which is secured to the top of the frame 12. Said levers respectively engage rotatably with the clutch members 21 and 22 for the purpose of sliding members on the shaft 18 into and out of engagement with the clutch pulleys 23 and 24 respectively. The other ends of said levers 31 and 32 are respectively provided with substantially right-angled slots 33 and 34, in which are respectively slidably mounted two upstanding pins 35 and 36, Fig. 5, which are respectively mounted in the two arms of a horizontal bell crank lever 37 which is rigidly secured to a vertical rock shaft 38, which is rotatably mounted in bearings 39, Fig. 2, which are secured to the frame 12. Rigidly secured to the shaft 38 is a pulley wheel 40, which is connected by a horizontal belt 41 to a pulley wheel 42, Fig. 6, which is rotatably mounted on a vertical rock shaft 43, two of which are provided, one at each end of the furnace and which have their upper ends respectively mounted pivotally in the two frame works 12, and which have their lower ends pivoted in bearings 44, which rest upon the ground or other suitable support. The vertical shafts 43 serve respectively as supports for two oscillatable frame works 45, each of which is provided with a plurality of rows of longitudinally arranged parallel angle bars 46, said rows being disposed respectively at the levels of the floors of the ovens 2. Said angle bars 46 are adapted to support the rakes 5, as they are respectively drawn from the adjacent ovens by the rods 6. The shafts 43, frame works 45 and angle bars 46 form turn tables, which are adapted to transfer the rakes 5 from in front of one tier of ovens to positions in front of the ovens of the adjacent tier. Secured to and revoluble with the pulley 42 is a sprocket wheel 47, which is connected by a chain belt 48 with a sprocket wheel 49, which is pivotally mounted on, but which is adapted to be locked, by mechanism hereinafter described, to a vertical rock shaft 50, which is pivoted in bearings 51, Fig. 2, secured to the adjacent frame-work 45. A handle comprising a vertical rod 52, having crank arms 53 secured thereto, is fastened by said arms to the rock shaft 50. The operator, by grasping the handle 52, after having first locked the sprocket wheel 49 to the rock shaft 50, by means of the mechanism to be hereinafter described, may oscillate the bell crank lever 37, through the intermediacy of the sprocket wheel 49, chain belt 48, sprocket wheel 47, pulley 42, belt 41, pulley 40, and rock shaft 38, for the purpose of engaging the clutch members 21 and 22 with the clutch pulleys 23 and 24 respectively. By swinging the handle 52 clockwise, the lever 37 will be swung, Fig. 6, so that the pin 35 will engage the lever 31 and force the clutch member 21 into engagement with the clutch pulley 23. The shaft 15 will then be driven by means of the gear wheels 17 and 20, shaft 18, and clutch members 21 and 23. The clutch pulley 23 is designed to drive the shaft 18 in a direction such that the chains 8, through the connecting mechanism already described, will force the rods 6, connected therewith, hooks foremost through the adjacent ovens 2, so that the rods may be hooked to the rakes 5, which are on the turntable at the distant end of the furnace. To effect this, the motor 30 adjacent to said clutch pulley is run in a direction such that the shaft 15 will be rotated clockwise, as viewed in Fig. 6.

To retract the rods 6 for drawing the rakes through the ovens 2, the shaft 15 is driven counterclockwise, as viewed in Fig. 6. To effect this the operator swings the handle 52 counter clockwise, as viewed in Fig. 6, thereby releasing the pin 35 from the lever 31 and causing the pin 36 to engage with the lever 32 so as to force the clutch member 22 into driving engagement with the clutch pulley 24, which being connected by a scrape belt 26, will revolve in a direction opposite to the clutch pulley 23. The vertical shaft 15 will thus be rotated by the mechanism already described in a counter clockwise direction, as viewed in Fig. 6, thereby rotating the gear wheels 13, which are at that time engaged with the gear wheels 14, in a direction such that rods 6 will be drawn with the rakes 5 attached thereto through the ovens 2.

Figure 1:
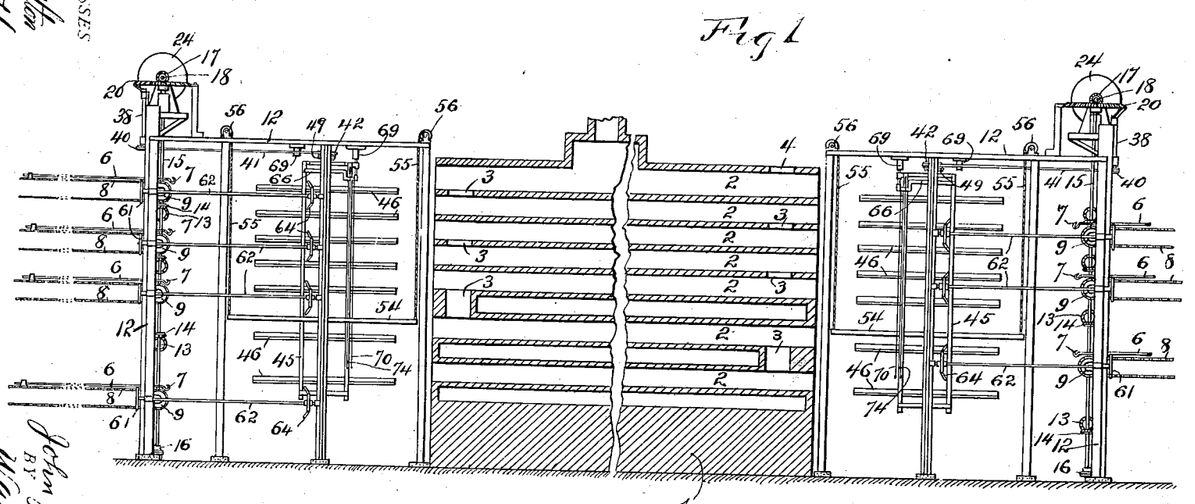
Figure 1 is a view, partly in side elevation and partly in vertical section of an ore roasting furnace provided with my improvement, some of the parts being removed and some broken away.

In order that the operators who are located one at each end of the furnace may have convenient access to the adjacent series of rods 6 for attaching and detaching them to and from the rakes 5, four vertically movable platforms 54 are provided two at each end of the furnace, one at each side of the adjacent turn table. These platforms 54 may be supported by cables 55 fastened respectively over pulleys 56, mounted on the top of the adjacent frame work 12 as viewed in Fig. 1. The cables 55 may be operated by any desired mechanism, not shown, such as is commonly employed for this purpose. An operator standing on the platform 54 may operate the handle rod 52 mounted on the adjacent turn table, when said turn table is swung adjacent to said platform. The operator may thus from said platform control the engagement of the clutch members 21 and 22 with the clutch pulleys 23 and 24, for the purpose of determining the direction of movement of the rake operating rods 6.

Figure 2:
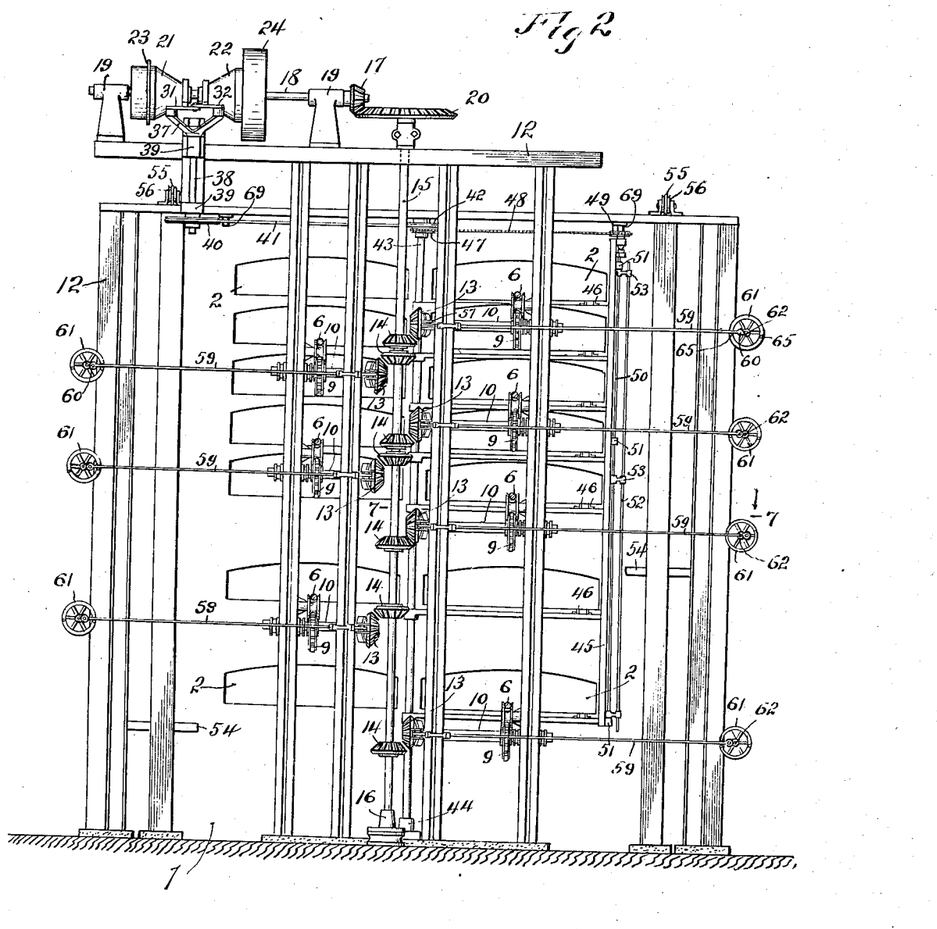
Fig. 2 is an end elevation of the furnace.
Figure 3:
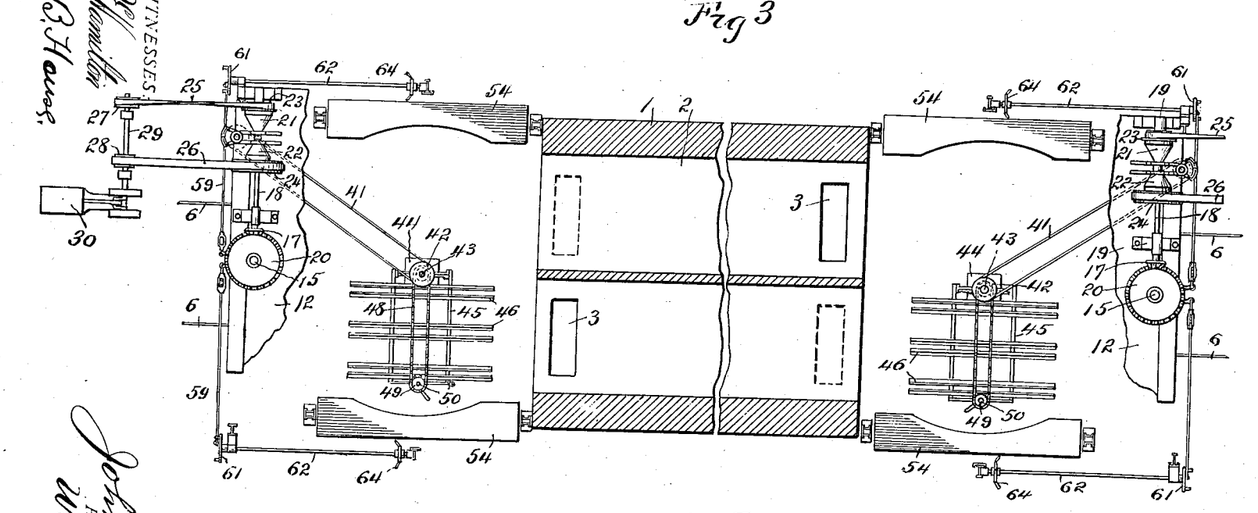
Fig. 3 is a view partly in plan and partly in horizontal section of a furnace provided with my improvement, some of the parts being broken away and some removed.
Figure 4:
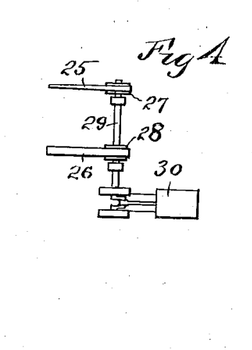
Fig. 4 is a plan view of the engine and some of the parts connected therewith, which is adapted to drive the mechanism at the right end of the furnace, as viewed in Fig. 3.
Figure 5:
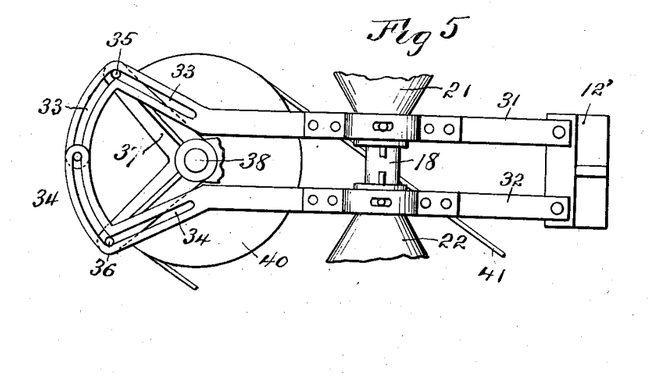
Fig. 5 is an enlarged plan view partly broken away, of a portion of the clutch mechanism which forms part of the transmission between one of the engines and the rake operating mechanism, operated by it.

In order that the operators while standing on the platforms 54 may control the sliding of the gear wheels 13 into and out of engagement with the gear wheels 14, the following described mechanisms are provided: Referring particularly to Figs. 2, 6, 7, 8 and 9, the slidable gear wheels 13 at each end of the furnace are respectively pivoted to horizontal levers 57, which are respectively pivoted intermediate of their ends to brackets 58 secured to the adjacent frame work 12. The other ends of said levers 57 are respectively pivoted to one set of ends of pitmen 59, the other set of ends of which are respectively pivoted to crank pins 60, which are respectively secured to wheels 61 rigidly secured respectively to a plurality of rock shafts 62, which are rotatably mounted in bearings 63, Fig. 6, secured to the adjacent frame 12. Each rock shaft 62 has secured to it a hand wheel 64, by means of which an operator standing on one of the platforms 54, which is adjacent thereto, may oscillate said rock shaft so as to slide the gear wheel 13, which is operated thereby, into or out of engagement with the gear wheel 14, with which it coöperates. As shown in Fig. 2, the rock shafts 62, which control the reciprocation of the adjacent rods 6, are located with their hand wheels 64 disposed adjacent to the platform 54, which is adjacent to said rods 6. For limiting the extent of oscillation of each rock shaft 62, the wheel 61 which is secured thereto, is provided on the side adjacent to its pitman 59 with two abutments 65, Figs. 7 and 8, which are disposed nearly diametrically opposite each other, and which are adapted respectively to strike against opposite sides of said pitman 59, thereby limiting the oscillation of said rock shaft.

For the purpose of releasably locking the turn tables in the two operative positions, shown in solid and dotted lines in Fig. 6, and for the purpose of preventing the operation of the clutch members 21 and 22, unless the turn tables are in said two operative positions, the following described mechanisms are employed:—There are two such mechanisms located respectively at opposite ends of the furnace, and as these mechanisms are alike, a description of one will answer for both. Referring particularly to Figs. 10 to 13, the frame work 45 of the adjacent turn table has pivoted to it a lever 66, which is pivoted to the lower end of a bolt 67, which is slidably mounted in a bearing 68 secured to the frame work 45 of the adjacent turn table, said bolt 67 being adapted to have its upper end inserted in either of two tubular socket members 69 secured to the frame work 12 at opposite sides of the ovens 2. When the turn table is disposed in either of the two operative positions, shown in solid and dotted lines in Fig. 6, the vertically movable bolt 67 is adapted to enter the adjacent socket member 69 and hold the turn table in such position. For lifting the lever 66 so as to cause the bolt 67 to enter the socket member 69, said lever has secured to it a rope 70, which extends upwardly from the lever and passes over a pulley 71 rotatably mounted on the frame 45. The rope 70 extends downwardly from said pulley 71, so that the operator standing on the adjacent platform 54 may pull the rope to lift the lever 66 at any position of the platform. To releasably hold the lever 66 in the locked position, a gravity actuated latch 72 is pivoted to the frame 45, and carries a weight 73, which normally forces the latch to a position in which it will engage and hold the lever 66 in its elevated locked position. To release the lever 66 from the latch 72, said latch has secured to it a rope 74, which passes upwardly therefrom over a pulley 75, which is rotatably mounted on the frame 45, and thence downwardly to a position where it is adapted to be grasped by the operator standing on the adjacent platform 54. By pulling downwardly on the free end of the rope 74, the latch 72 will be disengaged from the lever 66, and said lever will fall by gravity to the unlocked position shown in Fig. 10.

In order that the sprocket wheel 49 may be locked to the rock shaft 50, when the turn table is in either of the operative positions, shown in solid and dotted lines in Fig. 6, I provide on each turn table the following described mechanism: Again referring to Figs. 10 to 13, 76 designates a clutch member which is splined to and slidably mounted on the rock shaft 50, and which is provided with clutch teeth 77 which are adapted to engage with clutch teeth 78, provided at the lower end of the hub of the sprocket wheel 49, which is supported by and is rotatable on the rock shaft 50. Said clutch member 76 is supported by a ring member 79, which is embraced by the lever 66, and which is provided with diametrically opposite horizontal trunnions 80, which are respectively pivotally mounted in holes 81 provided therefor in the lever 66. When the lever 66 is vertically oscillated, the clutch member 76 will be slid vertically on the rock shaft 50. When the lever 66 is raised to the locked position, the clutch teeth 77 will engage the clutch teeth 78, thereby locking the sprocket wheel 49 to the rock shaft 50. If now said rock shaft be oscillated, by the operator swinging the handle rod 52 in the manner hereinbefore described, the sprocket wheel 49 will be oscillated, and, through the mechanism already described, the clutch members 21 and 22, adjacent thereto, may be alternately engaged with the clutch pulleys 23 and 24, for the purpose of reciprocating such of the rake operating rods 6, as will be placed in operative condition by the operator turning the operating rock shafts 62, which control the operation of said rods 6.

Two operators located at the respective ends of the furnace can operate the rakes from the platforms 54.

In operating my invention, the two turn tables will first be swung to the operative position at the respective ends of the tier of ovens in which an oven is to be raked. Each operator then lifts the adjacent lever 66 to the locked position, thereby engaging the adjacent bolt 67 with the adjacent socket member 69, and also engaging the clutch member 76 with the adjacent sprocket wheel 49. The platforms 54, which are respectively adjacent to the turn tables, are then lifted with the operators standing thereon to positions in which the rods 6 at the level of the first pair of ovens to be raked, may be readily attached to and detached from the rake with which the two ovens are to be raked. Assuming that the oven to be raked is the upper one in the right tier, as viewed in Fig. 2, the operator standing on the platform 54 at the left end of the furnace, as viewed in Figs. 1 and 6, first turns the upper adjacent rock shaft 62 in a direction such that the bell gear wheel 13, which is operated thereby, will engage the adjacent gear wheel 14. The same operator then swings the handle rod 52 in a clock wise direction, as viewed in Figs. 6, thereby, through the mechanism already described, swinging the lever 31 so as to engage the clutch member 21 with the pulley clutch 23. The shaft 18 will then be rotated in a direction such that the adjacent uppermost rod 6 will be forced into and through the right hand uppermost oven, as viewed in Fig. 2. When said rod 6 has passed through said oven, the operator at the other end of the furnace will attach the hook 7 of said rod to the rake 5, which is on the distant turn table and on a level with said oven. After this has been done, the first operator, who has previously turned the handle rod 52 to release the clutch member 21 from the clutch pulley 23, now swings said handle rod so as to engage the clutch member 22 with the clutch pulley 24. The rod 6 which has been attached to the rake 5 will now draw the rake slowly through the oven and onto the turn table which is adjacent to the first operator. The first operator then swings the handle rod 52 to the intermediate position, and also swings the uppermost rock shaft 62 to release the bevel gear wheel 13, which is operated thereby, from the adjacent gear wheel 14. In like manner, the remaining ovens in the same tier may be successively raked, at the end of which time all of the rakes will be on the turn table which is adjacent to the first operator. The operators then respectively pull the ropes 74 to release the levers 66 from their respective latches 72, also thereby releasing the clutch members 76 from the sprocket wheels 49. The two turn tables are then swung to positions respectively opposite the ovens of the other tier. The operations of raking which have just been described are then repeated, the rakes, however, being drawn through this tier of ovens in the opposite direction from that in which they traveled through the first tier of ovens, and the operating mechanisms for pushing and pulling the rake operating rods 6 at the opposite end of the furnace being employed for drawing the rakes through the second tier of ovens.

Figures 12, 13, 14:
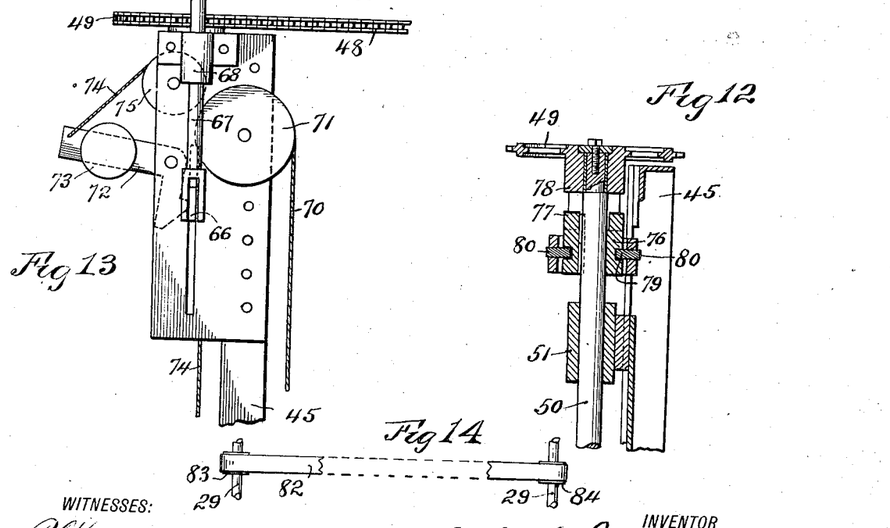
Fig. 12 is a vertical sectional view on the line 12—12 of Fig. 10.
Fig. 13 is a side elevation enlarged, showing the mechanism for lifting and latching the locking lever of one of the turn tables, and some of the parts connected therewith.
Fig. 14 is a plan view of the driving mechanism modified.

Instead of employing two motors 30 to rotate the driving shafts 29, a single engine or motor may be employed, a suitable transmission being established between said shafts, as by means of a belt 82 which connects two pulleys 83 and 84 respectively secured to the shafts 29, as shown in Fig. 14.

I do not limit my invention to the structures shown and described, as modifications, within the scope of the appended claims, may be made without departing from the spirit of my invention.

Having thus described my invention, what I claim and desire to secure by Letters Patent, is:—

1. In an ore roasting furnace, an oven, a rake movable therein, reciprocative means for moving said rake, a motor which, while the rake moving means is being reciprocated, runs continuously in one direction, means operated by said motor and including reversing clutch mechanism for reciprocating said rake operating means, an operator's support adjacent to said oven, means operable from said support for controlling said clutch mechanism, and means operable from said support for controlling the connecting with and disconnecting from of said motor operated means and said rake moving means.

2. In an ore roasting furnace, an oven, a rake movable therein, a rotary driving member which, while the rake operating means is being reciprocated runs continuously in one direction, a rotary driven member, rake operating means, means actuated by said driven member for reciprocating said rake operating means when said driven member is rotated alternately in opposite directions, means including connecting and disconnecting mechanism and operated by said driving member and including also reversing clutch mechanism for rotating said driven member in either direction, means operable from said support for controlling said connecting and disconnecting mechanism, and means operable from said support for controlling said clutch mechanism.

3. In an ore roasting furnace, an oven, a rake movable therein, driving means which, while the rake moving means is being reciprocated, runs continuously in one direction, means for operating said rake, reversing transmission mechanism actuated by said driving means for reciprocating said rake operating means, a turn table adjacent to said oven and adapted to support said rake, and means carried by said turn table for controlling said transmission mechanism.

4. In an ore roasting furnace, an oven, a rake movable therein, driving means which, while the rake moving means is being reciprocated, runs continuously in one direction, means for operating said rake, reversing transmission mechanism actuated by said driving means for reciprocating said rake operating means, a turn table adjacent to said oven and adapted to support said rake, an operator's support adjacent to said turn table, an operating member carried by said turn table, and means actuated by said member for controlling said transmission means, said member being operable from said support.

5. In an ore roasting furnace, an oven, a rake movable therein, driving means which, while the rake moving means is being reciprocated, runs continuously in one direction, means for operating said rake, transmission means including reversing clutch mechanism and actuated by said driving means for reciprocating said rake operating means, a turn table adjacent to said oven and adapted to support said rake, an operator's support adjacent to said turn table, an operating member carried by said turn table and operable from said support, and means actuated by said member for controlling said clutch mechanism.

6. In an ore roasting furnace, an oven, a rake movable therein, driving means which, while the rake moving means is being reciprocated, runs continuously in one direction, means for operating said rake, transmission means including reversing mechanism and connecting and disconnecting mechanism for reciprocating said rake operating means and operated by said driving means, an operator's support adjacent to said oven, means operable from said support for controlling said reversing mechanism, and means operable from said support for controlling said connecting and disconnecting mechanism.

7. In an ore roasting furnace, an oven, a rake movable therein, driving means which, while the rake moving means is being reciprocated, runs continuously in one direction, means for operating said rake, transmission means including reversing clutch mechanism and connecting and disconnecting mechanism actuated by said driving means for reciprocating said rake operating means, an operator's support adjacent to said oven, means operable from said support for controlling said clutch mechanism, and means operable from said support for controlling said connecting and disconnecting mechanism.

8. In an ore roasting furnace, an oven, a rake operable therein, means for operating said rake, a pivoted turn table adjacent to one end of said oven, two oscillating members, one carried by said turn table and the other having the same axis as the turn table, connecting means for transmitting motion from one oscillating member to the other, means for reciprocating said rake operating means, means for turning the oscillating member carried by the turn table, and means actuated by the other oscillating member for controlling the direction of movement of said rake operating means by said reciprocating means.

9. In an ore roasting furnace, an oven, a rake operable therein, a rake operating member, a pivoted turn table adjacent to said oven, and adapted to carry said rake, two oscillating members, one having the axis of said turntable, the other being carried by the turntable, means for transmitting motion from one oscillating member to the other, means for reciprocating said rake operating member, an operator's support adjacent to said turn table, means operable from said support for turning the member carried by said turntable, and means actuated by the other oscillating member for controlling the direction of movement of said rake operating means by said reciprocating means.

10. In an ore roasting furnace, an oven, a rake operable therein, a rake operating member, a pivoted turntable adjacent to said oven and adapted to carry said rake, two oscillating members, one having the axis of the turntable and the other carried by the turntable, means for transmitting motion from one oscillating member to the other, means including a reversing clutch mechanism for reciprocating said rake operating member, a support adjacent to the turntable adapted to carry an operator, means operable from said support for turning the oscillating member carried by said turntable, and means actuated by the other oscillating member for controlling said clutch mechanism.

11. In an ore roasting furnace, a rake, an oven in which the rake is operable, a rake operating member, a pivoted turntable adjacent to said oven and adapted to carry said rake, two oscillating members, one having the axis of the turntable and the other carried by the turntable, a belt connecting said oscillating members, means for reciprocating said rake operating member, means for turning the oscillating member carried by said turntable, and means actuated by the other oscillating member for controlling the direction of movement of said rake operating means by said reciprocating means.

12. In an ore roasting furnace, an oven, a rake operable therein, a rake operating member, a pivoted turntable adjacent to said oven and adapted to carry said rake, two oscillating members, one having the axis of said turntable, the other being carried by said turntable, a belt connecting said oscillating members, means for reciprocating said rake operating member, an operator's support adjacent to said turntable, means operable from said support for turning the oscillating member carried by said turntable, and means actuated by the other oscillating member for controlling the direction of movement of said rake operating means by said reciprocating means.

13. In an ore roasting furnace, an oven, a rake operable therein, a rake operating member, a pivoted turntable adjacent to said oven and adapted to carry said rake, two oscillating members, one having the axis of the turntable, the other being carried by the turntable with its axis eccentric to the axis thereof, means for transmitting motion from one oscillating member to the other, means for reciprocating said rake operating member, two pulleys, a belt connecting said pulleys, means actuated by one of said pulleys for controlling said reciprocating means, the other pulley being rotatable with the oscillating member having the axis of the turntable, and means for turning the oscillating member carried by the turntable.

14. In an ore roasting furnace, an oven, a rake operable therein, a rake operating member, a pivoted turntable adjacent to said oven and adapted to carry said rake, two oscillating members, one having the axis of the turntable, the other being carried by the turntable with its axis eccentric to the axis thereof, a belt connecting said oscillating members, means for reciprocating said rake operating member, two pulleys, one rotatable with the oscillating member having the axis of the turntable, means actuated by the other pulley for controlling said reciprocating means, a belt connecting said pulleys, and means for oscillating the oscillating member carried by the turn table.

15. In an ore roasting furnace, an oven, a rake operable therein, a rake operating member, power means which runs continuously in one direction, means actuated by said power means for reciprocating said rake operating member and including connecting and disconnecting mechanism effective for making or breaking connection between the power means and said reciprocating means, an operator's support adjacent to said oven, an operating shaft operable from said support, and means actuated by said shaft for controlling said connecting and disconnecting mechanism.

16. In an ore roasting furnace, an oven, a rake operable therein, a rake operating member, power means which runs continuously in one direction, means actuated by said power means for reciprocating said rake operating member and including reversing clutch mechanism and connecting and disconnecting mechanism effective for making or breaking connection between the power means and said reciprocating means, an operator's support adjacent to said oven, a rock shaft operable from said support, means actuated by said rock shaft for controlling said connecting and disconnecting mechanism, and means operable from said support for controlling said clutch mechanism.

17. In an ore roasting furnace, an oven, a rake operable therein, a rake operating member, power means which runs continuously in one direction, means actuated by said power means for reciprocating said rake operating member and including reversing mechanism and connecting and disconnecting mechanism effective for making or breaking connection between the power means and said reciprocating means, an operator's support, a pivoted turntable adjacent to said oven and to said support and adapted to carry said rake, a rock shaft operable from said support, means actuated by said rock shaft for controlling said connecting and disconnecting mechanism, and means carried by said turntable and operable from said support for controlling said reversing mechanism.

18. In an ore roasting furnace, an oven, a rake operable therein, a rake operating member, power means which runs continuously in one direction, means actuated by said power means for reciprocating said rake operating member and including reversing mechanism and connecting and disconnecting mechanism effective for making or breaking connection between the power means and said reciprocating means, a pivoted turn table adjacent to said oven and adapted to carry said rake, an operator's support adjacent to said turn table, two oscillating members, one having the axis of said turn table, and the other carried by said turn table, means operable from said support for controlling said connecting and disconnecting mechanism, means for transmitting motion from one oscillating member to the other, means operable from said support for turning the oscillating member carried by the turn table, and means actuated by the other oscillating member for controlling said reversing mechanism.

19. In an ore roasting furnace, an oven, a rake operable therein, a rake operating member, power means which runs continuously in one direction, means actuated by said power means for reciprocating said rake operating member and including reversing mechanism and connecting and disconnecting mechanism effective for making or breaking connection between the power means and said reciprocating means, a pivoted turn table adjacent to said oven and adapted to carry said rake, an operator's support adjacent to said turn table, a rock shaft operable from said support, means actuated by said rock shaft for controlling said connecting and disconnecting mechanism, two oscillating members, one having the axis of said turn table, and the other carried by said turn table, means for transmitting motion from one oscillating member to the other, means operable from said support for turning one of said oscillating members, and means actuated by the other oscillating member for controlling said reversing mechanism.

20. In an ore roasting furnace, an oven, a rake operable therein, a rake operating member, means including two gear wheels adapted to intermesh with each other for reciprocating said rake operating member, one of said gear wheels being movable into and out of engagement with the other gear wheel, an operator's support adjacent to said oven, an operating rock shaft operable from said support, and means actuated by said rock shaft for moving the movable gear wheel into and out of engagement with the other gear wheel.

21. In an ore roasting furnace, an oven, a rake operable therein, a rake operating member, means including two gear wheels adapted to intermesh with each other for reciprocating said operating member, one of said gear wheels being movable into and out of engagement with the other, an operator's support adjacent to said oven, a lever for moving said movable gear wheel, a rock shaft having means for being operated from said support, and means actuated by said rock shaft for swinging said lever.

22. In an ore roasting furnace, an oven, a rake operable therein, a rake operating member, means including connecting and disconnecting mechanism for reciprocating said rake operating member, a rock shaft having a crank and operable from a point adjacent to said oven, a lever for operating said connecting and disconnecting mechanism, and a pitman connected to said lever and to said crank.

23. In an ore roasting furnace, an oven, a rake operable therein, a rake operating member, means including two gear wheels adapted to intermesh with each other and movable into and out of engagement with each other, a rock shaft having a crank and operable from a point adjacent to said oven, a lever for moving said movable gear wheel, and a pitman connected to said lever and to said crank.

24. In an ore roasting furnace, two tiers of ovens, a pivoted turn table arranged to transfer rakes from positions in front of one tier of ovens to positions in front of the other tier of ovens, rakes operable in said ovens and adapted to be carried by said turn table, means for operating said rakes, a rock shaft pivoted to said turn table and having an operating handle, a member rotatable on said rock shaft, means for operatively connecting said member to said rock shaft, and means actuated by said member for controlling the starting and stopping of said rake operating means.

25. In an ore roasting furnace, two tiers of ovens, a pivoted turn table, rakes operable in said oven and adapted to be transferred from positions in front of one tier to positions in front of the other tier, means for operating said rakes, a rock shaft pivoted to said turn table and having an operating handle, a member rotatable on said rock shaft, releasable clutch mechanism for securing said member to said rock shaft, and means actuated by said member for controlling the starting and stopping of said rake operating means.

26. In an ore roasting furnace, two tiers of ovens, a pivoted turn table, rakes operable in said ovens and adapted to be transferred by said turn table from in front of one tier to positions in front of the other tier, means for operating said rakes, a rock shaft pivoted to said turn table and having an operating handle, a member rotatable on said shaft, releasable clutch mechanism for securing said member to said rock shaft and including a lever, a latch for holding said lever in the locked position, and means actuated by said member for controlling the starting and stopping of said rake operating means.

27. In an ore roasting furnace, two tiers of ovens, a pivoted turn table, rakes operable in said ovens and adapted to be transferred by said turn table from in front of one tier to positions in front of the other tier, means for operating said rakes, a rock shaft pivoted to said turn table and having an operating handle, a member rotatable on said rock shaft, releasable means including a lever for locking said member to said rock shaft, means actuated by said member for controlling the starting and stopping of said rake operating means, means for swinging said lever into the locked position, releasable means for holding said lever in the locked position, and means for releasing said lever from said holding means.

28. In an ore roasting furnace, two tiers of ovens, a frame work at one end of said tiers, a pivoted turn table, rakes operable in said ovens and adapted to be transferred by said turn table from in front of one tier to positions in front of the other tier, and means for releasably locking the turn table in operative positions respectively in front of said two tiers and to said frame work.

29. In an ore roasting furnace, two tiers of ovens, a frame work at one end of said two tiers, a pivoted turn table, rakes operable in said ovens, and adapted to be transferred by said turn table from in front of one tier to positions in front of the other tier, means for releasably locking the turn table in operative position to said frame work, means for operating said rakes, and means controlled by said locking means for controlling the starting and stopping of said rake operating means.

30. In an ore roasting furnace, two tiers of ovens, a frame work, a pivoted turn table, rakes operable in said ovens and adapted to be transferred by said turn table from in front of one tier to positions in front of the other tier, a lever carried by said turn table, means operated by the lever for locking the turn table to said frame work, means for operating said rakes, and means controlled by said lever for controlling the starting and stopping of said rake operating means.

31. In an ore roasting furnace, two tiers of ovens, a frame work, a pivoted turn table, rakes operable in said oven and adapted to be transferred by said turn table from in front of one tier to positions in front of the other tier, a rock shaft pivoted to said turn table and having an operating handle, means for releasably locking the turn table to said frame work, rake operating means, and means actuated by said rock shaft and controlled by said locking means for controlling the starting and stopping of said rake operating means.

32. In an ore roasting furnace, two tiers of ovens, a frame work, a pivoted turn table, rakes operable in said ovens, means for operating said rakes, said rakes being adapted to be transferred by said turn table from in front of one tier to positions in front of the other tier, a rock shaft pivoted to said turn table and having an operating handle, a member rotatable on said rock shaft, a clutch member rotatable with said rock shaft and slidable thereon into and out of engagement with said rotatable member, means actuated by said rotatable member for controlling the starting and stopping of said rake operating means, and means for sliding said clutch member and for releasably locking the turn table to said frame work.

33. In an ore roasting furnace, two tiers of ovens, a frame work, a pivoted turn table, rakes operable in said ovens and adapted to be transferred by said turn table from in front of one tier to positions in front of the other tier, means for operating said rakes, a rock shaft pivoted to said turn table and having an operating handle, a member rotatable on said rock shaft, means actuated by said member for controlling the starting and stopping of said rake operating means, a clutch member rotatable on said rock shaft and slidable thereon into and out of engagement with said rotatable member, a lever for sliding said clutch member into and out of the locking position, and means operated by said lever for locking the turn table to said frame work.

34. In an ore roasting furnace, two tiers of ovens, a frame work, a pivoted turn table, rakes operable in said ovens and adapted to be transferred by said turn table from in front of one tier to positions in front of the other tier, rake operating means, means for releasably locking the turn table in two operative positions to said frame work, and means operable only when said locking means is in the locking position for controlling the starting and stopping of said rake operating means.

35. In an ore roasting furnace, two tiers of ovens, a pivoted turn table, a frame work, rakes operable in said ovens and adapted to be transferred by said turn table from in front of one tier to positions in front of the other tier, rake operating means, releasable means for locking the turn table to the frame work, an operator's support, means operable from said support and controlled by said locking means for controlling the starting and stopping of said rake operating means.

In testimony whereof I have signed my name to this specification in presence of two subscribing witnesses.

JOHN J. SIMMONDS.

Witnesses:
R. B. BOONE, Jr.,
BAXTER D. McCLAIN.